United States Patent [19]

Koide et al.

[11] 4,104,073
[45] Aug. 1, 1978

[54] FIRE RETARDANT INTUMESCENT PUTTY

[75] Inventors: Yooichi Koide; Tamotsu Kaide; Michio Takada; Keiji Ichikawa, all of Amagasaki, Japan

[73] Assignee: Dainichi-Nippon Cables, Ltd., Japan

[21] Appl. No.: 686,964

[22] Filed: May 14, 1976

[30] Foreign Application Priority Data

| May 16, 1975 | [JP] | Japan | 50-58936 |
| May 16, 1975 | [JP] | Japan | 50-58937 |
| Sep. 22, 1975 | [JP] | Japan | 50-115002 |
| Sep. 22, 1975 | [JP] | Japan | 50-115003 |

[51] Int. Cl.² ............................................. C09D 5/18
[52] U.S. Cl. .................................. 106/15 FP; 252/8.1
[58] Field of Search .................... 106/15 FP; 252/8.1; 260/45.7 P, 45.9 NP, 45.95, 42, 42.15

[56] References Cited

U.S. PATENT DOCUMENTS

| 3,449,161 | 6/1969 | Hindersinn et al. | 106/15 FP |
| 3,513,114 | 5/1970 | Hahn et al. | 106/15 FP |
| 3,654,190 | 4/1972 | Levine | 260/45.9 NP |
| 3,853,831 | 12/1974 | Hindersinn | 106/15 FP |
| 3,893,928 | 7/1975 | Ono et al. | 264/29.7 |
| 3,936,416 | 2/1976 | Brady | 260/45.9 NP |
| 3,981,832 | 9/1976 | Godfried | 106/15 FP |

Primary Examiner—Lorenzo B. Hayes
Attorney, Agent, or Firm—Pollock, Vande Sande & Priddy

[57] ABSTRACT

The herein-disclosed putty is for forming air-tight and smoke-tight seals under normal and fire exposure conditions, and bubbles up when heated with flame, producing a foamed carbonaceous layer having outstanding fire-retardancy. It is a mixture having a cone penetration value of 2–40 which includes (a) liquid or semi-solid organic material having a viscosity of 50–100,000 c.st. at 210° F and (b) a phosphoric acid compound substituted with one or more nitrogen-containing groups. The putty may also contain (c) polyhydric alcohols and/or carbohydrates for increased fire retardancy, (d) blowing agents for increased insulating effect, (e) grease, for high temperature flow resistance, (f) heat resistant fiber, for reinforcement, (g) microballoons, for increased insulating effect and other additives. The enclosed drawing discloses particularly desirable proportions for the components (c) and (d) in relation to the amount of component (b).

22 Claims, 1 Drawing Figure

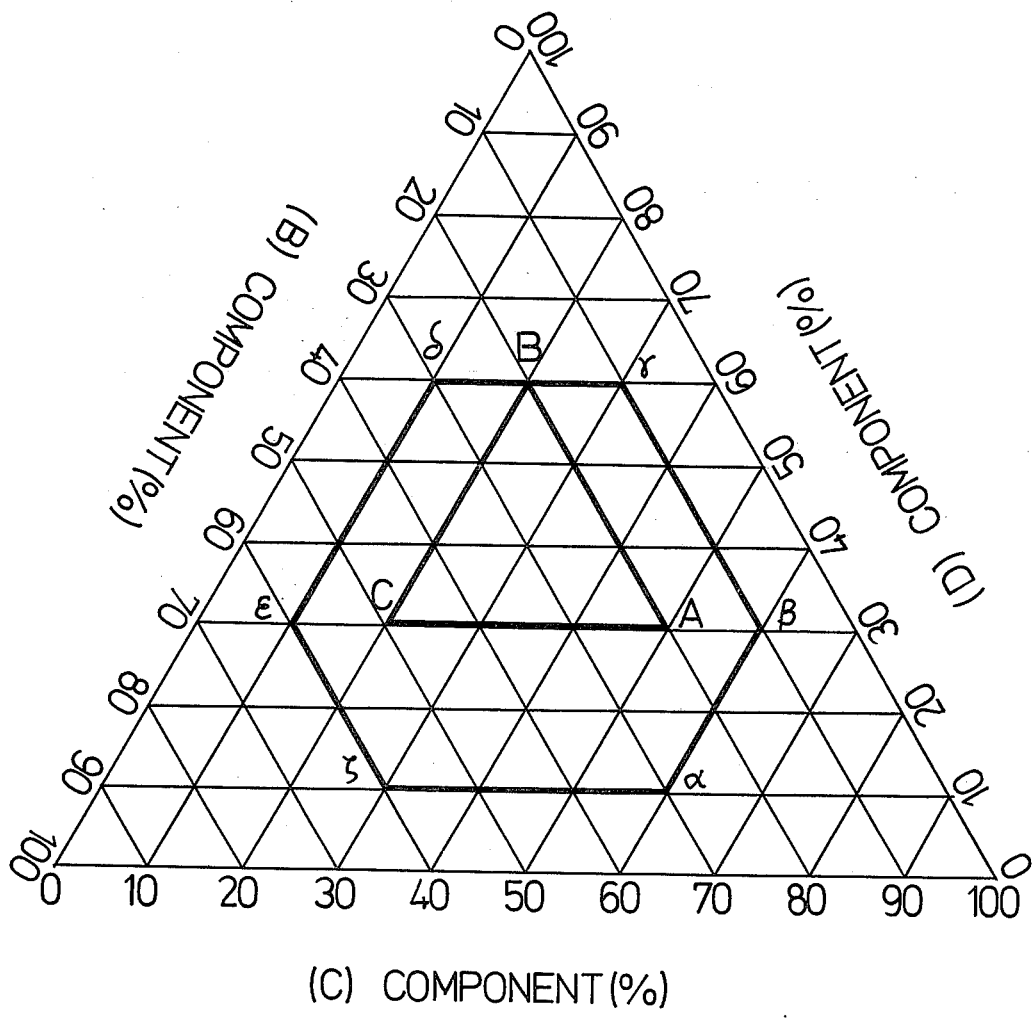

4,104,073

FIRE RETARDANT INTUMESCENT PUTTY

BACKGROUND OF THE INVENTION

Fire-resistant or -retardant materials are used as interior finishes for buildings, ships and vehicles. Also, emergency equipment, such as standby generators or batteries, are protected by fire walls to ensure that they can continue functioning during a fire, at least temporarily. The fire walls are usually provided with one or more through-holes by which electrical cables pass to and from the emergency power source. These through-holes are seldom completely filled by the cables, leaving some free air-space in the through-hole. In a fire, smoke and flames will pass through such an air space to the inside of the fire wall, and consequently burn the emergency equipment. To prevent passage of smoke, heat and flame, such air spaces have been closed off with nonflammable plates or blocks at the ends of the through-holes or have been filled with nonflammable fibers. However, these conventional techniques do not always provide satisfactory fire and smoke protection. Sometimes, the air space is filled with concrete, but the resulting necessity of breaking away the concrete makes the installation of additional cables inconvenient. Because of these difficulties, there is a need for improved ways of sealing such through-holes.

BRIEF DESCRIPTION OF THE DRAWING

The drawing is a triangular coordinates diagram showing the proportions of components (b), (c) and (d) employed in certain preferred embodiments of the invention.

SUMMARY OF THE INVENTION

The present invention is a putty which can be packed into cable through-holes, wall joints and other cavities to render them highly air-tight and smoke-tight under both normal and fire exposure conditions, and which will bubble up when heated to produce a foamed carbonaceous layer having outstanding fire retardancy. The putty is a fire retardant mixture of ingredients having a cone penetration value of 2–40 (mm/150 g, 5 sec, at 20° C) determined in accordance with JIS (Japanese Industrial Standard) A5752-1966, and which includes as the putty base, a mixture of components (a) and (b) in amounts effective to form the foamed carbonaceous layer. Component (a) is an organic material which is a semi-solid or liquid at room temperature and which has a viscosity of 50–100,000 c.st. at 210° F, said component (a) being foamable to a carbonaceous layer when burned in admixture with component (b). Component (b) contains at least about 7% by weight of phosphorus and is, or corresponds in structure, to a phosphoric acid represented by the general formula $(xH_2O \cdot yP_2O_5)n$, wherein $(x/y) > 0$ and $\leq 3$ and $n$ equals from 1 to about 14, one or all of the hydrogen atoms of said phosphoric acid being substituted with a mono-, di- or tri-valent functional group consisting essentially of nitrogen and either or both of hydrogen and carbon. The putty will include components (a) and (b) alone or in combination with any known additives for fire retardant compositions, provided that the putty is a fire-retardant mixture having the above cone penetration value. Moreover, the invention contemplates that the components (a) and (b) may be used in admixture with at least one of the following additional components: (c) polyhydric alcohols and carbohydrates, (d) blowing agents, (e) greases, (f) heat resistant fibers, and (g) microballoons. When the putty contains the putty base and the aforementioned components (c) and (d), particularly desirable compositions result from mixtures in which the proportions of components (b), (c) and (d) are within the region defined by points $\alpha, \beta, \gamma, \delta, \epsilon, \zeta$, and particularly by points A, B and C, in the accompanying drawing. As will be seen from the description of preferred embodiments below, the invention is also directed to compositions containing certain species of the above-described components which give unexpectedly good results.

DESCRIPTION OF VARIOUS EMBODIMENTS

The putty preferably consists essentially of a fire retardant mixture of ingredients including components (a) and (b). They may be used alone or in combination with other ingredients suitable for the fire-retardant mixture, provided the mixture contains, based on the total weight of putty, at least about 4% by weight of (a) and at least about 13% by weight of (b), and has a cone penetration value of about 2 to 40 (mm/150 g, 5 sec., at 20)C) as determined according to JIS A5752-1966 (Putty for Metal Sash Glazing). If the cone penetration value is below 2, the putty will be difficult to apply, while at penetration values above 40 the putty will have poor airtightness and fire retardancy. The cone penetration value is preferably about 3–20, and more preferably about 4–15. If the putty is deficient in its content of (a) it will have poor airtightness. Preferably at least about 5% and more preferably at least about 6% by weight of component (a) is employed. On the other hand, unless at least about 13% by weight of the component (b) is present in the putty, it is difficult for the resulting product to produce a foamed carbonaceous layer even when heated by flame. Preferably the putty contains at least about 15% and more preferably at least about 20% by weight of the component (b).

Component (a) - Organic Liquid or Semi-Solid

The organic material used as component (a) in the present invention is liquid or semi-solid at room temperature (at about 25° C). The description of such material as "semi-solid" in the present specification and claims means that it has a cone penetration value of at least about 50 as determined according to JIS K2560-1969 (Testing Method for Cone Penetration of Lubricating Greases). The component (a) also has a viscosity in the range of about 50–100,000, preferably about 200–50,000, and most preferably about 500–10,000 c.st. If the cone penetration is smaller than 50 and the material has the wrong viscosity at 210° F, it is difficult to obtain a putty having excellent fire retardancy and/or airtightness as contemplated by the invention.

The component (a) is a material which, when burned in the presence of component (b), described below, generates a foamed carbonaceous layer. Preferable are those which are somewhat hard to burn. With the aid of the foregoing disclosures and simple screening tests, persons skilled in the art will readily select materials useful as component (a). However, the materials considered particularly useful are those which have, for every 10 atoms of carbon in their molecules, from zero to about 6 and preferably from 1–5 atoms of an element or elements other than hydrogen, such as oxygen, nitrogen, halogen, phosphorus or sulfur, preferably at least one of oxygen, nitrogen, halogen, or phosphorus. Exemplary compounds for the component (a) are petroleum hydrocarbon oils; oligomers of butene, propylene, ethylene and like olefins; chlorinated paraffin, chlorinated diphenyl, and other or like halogenated organic materials; liquid or semi-solid materials of rubbers such as chloroprene, butadiene, nitrile, and the like; oligomers of urethane; and asphalts.

Component (a) may be any one or a mixture of the foregoing materials. But the component (a) can also be a blend of one or more of the foregoing liquid and/or semi-solid materials with one or more natural and/or synthetic substances which are solids at room temperature which blend fulfills the requirements previously given for component (a). Examples of such solid natural or synthetic substances are high-molecular-weight materials such as ethylene-vinyl acetate copolymer, natural rubber, styrene-butadiene rubber, nitrile rubber, chloroprene rubber, polyisobutylene, atactic polypropylene and the like; asphalts; waxes such as paraffin wax, microcrystalline wax, Fisher-Tropsh wax and the like; oil modified alkyd resin; and rosin. It is preferred that the component (a) be free from silicon.

Component (b) - Nitrogen-Containing Phosphates

The nitrogen-containing phosphates used as component (b) should contain at least about 7% and preferably at least about 10% by weight of phosphorous; otherwise, it is difficult to form a satisfactorily fire-retardant carbonaceous layer. The phosphates are characterized by a structure corresponding in general to that obtained by substituting nitrogen-containing groups for the hydrogen atoms of phosphoric acid represented by the formula $(xH_2O \cdot yP_2O_5)n$, wherein $0 < (x/y) \leq 3$ and $n$ is 1 to about 14. The applicable nitrogen-containing groups are organic mono-, di- and tri-valent groups consisting essentially of nitrogen and either or both of hydrogen and carbon. Exemplary of such groups are $NH\equiv$, $NH_2=$, $NH_3-$, $NH_4-$, $-NC-$ and others, which may be bonded to the phosphate radical individually or in the form of cyclical or linear chains, containing a plurality of the above groups, such as triamino-s-triazine group and guanyl urea group. Where the nitrogen-containing phosphate includes more than one nitrogen-containing group, such groups may be the same or different. Examples of the nitrogen-containing phosphates are monoammonium phosphate, diammonium phosphate, ammonium polyphosphate having an average molecular weight of about 200–300,000 and containing about 10–25% by weight of nitrogen, and like ammonium phosphates; melamine monophosphate, melamine diphosphate, melamine triphosphate and like amine phosphates; guanyl urea phosphate, urea phosphate, polyphosphorylamide, phosphoryl trianilide and like amide phosphates; etc., preferred examples of which are melamine monophosphate, and ammonium polyphosphates represented by the formula $H_{(n-m)} + 2(NH_4)_m P_n O_{3n+1}$ wherein $n/m$ is about 0.7–1.1 having an average degree of polymerization of about 20–400 or those represented by the formula $(NH_4)_{n+2} P_n O_{3n+1}$ having an average degree of polymerization of about 150–200. These phosphates may be used singly or in mixtures of two or more.

The invention also includes the discovery that greatly improved fire retardation and air-tightness can be obtained when at least one of the components (c)-(g) given below is combined with the foregoing components (a) and (b).

Component (c) - Polyhydric Alcohols and Carbohydrates

The useful alcohols and carbohydrates used in the invention have an OH index as defined below of at least about 0.2, or preferably at least about 0.8, based on the following formula:

$$\text{OH Index} = 100x - \frac{[\text{number of OH groups per molecule}]}{[\text{molecular weight of the molecule}]}$$

Where mixtures of alcohols or carbohydrates are used, the average number of OH groups per molecule and the molecular weight per average molecule are used in calculating the OH index. These alcohols and carbohydrates are also characterized by containing about 35–70% by weight of carbon per molecule (including per average molecule). They may be used singly or in combinations of at least two of them. Examples of the alcohols are monopentaerythritol, dipentaerythritol, tripentaerythritol, triethylene glycol, sorbitol, glycerin, trimethylolmethane, trimethylolpropane, diethylene glycol, propylene glycol, hexamethylene glycol, inositol, and others. Examples of the carbohydrates are dextrin, starch, glucose, sucrose, and others. Among these, monopentaerythritol, dipentaerythritol, tripentaerythritol and starch are preferable.

The amount of component (c) is about 10–150 parts, preferably about 30–100 parts, and more preferably about 40–60 parts, per 100 parts by weight of component (b), the nitrogen-containing phosphate. The use of component (c) imparts greatly improved fire retardation to the putty, when foamed. The improvement in fire retardation obtained with alcohols and carbohydrates having an OH index and/or a carbon content outside of the above ranges has been rather poor.

Component (d) - Blowing Agent

The blowing agent emits a gas or gases, such as nitrogen, carbon monoxide, carbon dioxide, and ammonia, when thermally decomposed, and preferably has a decomposition temperature of about 120°–400° C. Examples of useful blowing agents are melamine, ureaformaldehyde, aminoacetic acid, trimethylolmelamine, hexamethylolmelamine, melamine resin which is solid at room temperature (which may for instance be a melamine resin that ranges from being about half cross-linked to completely cross-linked and is prepared by the addition condensation reaction of melamine and formaldehyde), guanidine and like organic amines; dicyandiamide, butylurea, casein, azodicarbonamide, nitrosulfonamide, and like organic amides; parachlorometaxylenol, tetrachlorophthalate resin, pentachlorophenyl and like halogenated organic compounds; benzene-sulfonhydrazide and like sulfonhydrazides; and aminoguanylurea and like guanyl compounds. Particularly preferred are melamine, trimethylolmelamine, hexamethylolmelamine, dicyandiamide, and the like. The most desirable example is finely divided melamine at least about 95% of which has an average diameter smaller than about 50 μm.

One or more of these blowing agents can be used in an amount which is effective to promote foaming of the putty on heating. More particularly, the amount of component (d) is about 10–200 parts, preferably about 30–150 parts, and more preferably about 60 to 120 parts, per 100 parts by weight of the nitrogen-containing compound. When used, the component (d) enhances the heat-insulating properties of the putty and therefore improves its fire retardancy.

Component (e) - Grease

The greases usable in the invention are those which are in the form of a viscous paste or semi-solid at room temperature, and which comprise a thickener and a natural or synthetic medium. They are commonly referred to as lubricating greases or simply as greases, as distinct from lubricants which are merely liquid oils.

Exemplary of the natural or synthetic media in these greases are natural oils, such as transformer oil, spindle oil, cable insulating oil, machine oil, rosin oil, castor oil, olive oil, and arachis oil; synthetic lubricating oils such as polybutene oil, chlorinated paraffin oil and polyethylene glycol; and the like. Useful thickeners include, for example, metallic soaps such as higher fatty acid salts of Ba, Sr, Zn, Pb, Cd, K, Na, Ca, Li, Al and like metals, and non-soaps such as bentonite, silica gel, phthalocyanine, and the like. Examples of suitable greases include for example those referred to as sodium soap grease, calcium soap grease, lithium soap grease, aluminum complex grease (for instance, as disclosed in U.S. Pat. No. 2,768,138), as well as greases of the non-soap type such as bentonite grease, silica gel grease, and so forth. Other useful greases are disclosed by Hiroshi Horiguchi in "Lubricants and Greases" (pages 402–419, Sankyoshuppan Co., Ltd., Tokyo, February 1970). Preferred among these examples are greases having a cone penetration value of 40–500 as determined according to JIS K2560-1969 (Testing Method for Cone Penetration of Lubricating Greases). Especially preferable are lithium soap grease, aluminum complex grease, bentonite grease and silica gel grease having a cone penetration value of about 40–500 and more preferably about 80–350. The greases may be used singly or in combinations of two or more.

The amount of component (e) is generally about 70–400 parts, preferably about 100–300 parts, and more preferably about 150–250 parts, per 100 parts by weight of the component (a). Component (e) reduces the fluidity of the putty at elevated temperatures, but does not significantly impair its room temperature application properties. Due to its excellent thermal flow-resistance (resistance to flow at high temperatures), the putty which contains component (e) is substantially more likely to remain in place in a vertical through-hole during a fire.

Component (f) - Heat-Resistant Fiber

One or more organic or inorganic fibers may be included in the putty for reinforcement and improvement of its airtightness. In general, their softening points and decomposition temperatures, if any, should be above 200° C. Examples of useful fibers are asbestos, glass wool, rock wool, and carbon fibers; aluminum, iron, copper and like metal fibers; fibers of polyamide, polyimide, polyamideimide, Teflon (trademark), polyphenylphenyleneoxide, polysulphone, and like heat-resistant organic polymers; and others. The heat-resistant fibers are preferably up to about 100 $\mu$m, and more preferably about 0.05–20 $\mu$m in diameter. Their length is generally about 0.5–100 mm and more preferably about 1–50 mm.

The amount of component (f) is generally about 1–100 parts, preferably, about 5–60 parts, more preferably about 10–30 parts, per 100 parts by weight of component (a).

Component (g) - Microballoons

As is well known, microballoons are fine, hollow particles of organic or inorganic material. Their interior voids may be closed or open to the atmosphere. One or more kinds of microballoons can be used. Their average particle size is generally about 5–1,000 $\mu$m, and preferably about 10–300 $\mu$m. Their bulk density is generally about 0.01–0.7, and preferably about 0.1–0.5 (g/cc). Examples of suitable microballoons are glass balloons made of borosilicate glass, glass from volcano (shirasu) and like glasses; plastic balloons made of epoxy resin, phenolic resin, chlorinated vinylidene-acrylonitrile copolymer resin such as Saran (trademark) and like synthetic resins; carbon balloons; and others.

In general, the amount of component (g) is about 20–700 parts, preferably about 100–500 parts, and more preferably about 200–400 parts, per 100 parts by weight of the component (a). Incorporation of component (g) in the putty of the invention enhances the heat insulating properties of the foamed carbonaceous layer produced therefrom, greatly improving its fire retardancy.

According to the present invention, any one of the components (c)–(g), when used conjointly with the components (a) and (b), gives an improved putty. However, use of at least two of the components (c)–(g) is preferable, since the resulting putty will then be improved in one or more of the properties of fire retardancy, airtightness, mixing compatibility, moisture resistance, and thermal aging resistance as seen from Examples below, due to the synergistic effects of the combined components. The preferred combinations of the components are (c and d), (d and e), (d and f), (d and g), (c, d, and e or f or g), (c, d, e, and f), (c, d, e, and g), (e and f), (e and g), and (c, d, e, f, and g). In these combinations, the components may be used in the amounts already given for them respectively. However, when both the components (c) and (d) are present in the putty, the proportions of the components (b), (c) and (d), irrespective of whether components (e)–(g) are used or not, are preferably within the region represented by the area on the triangular coordinates of the drawing enclosed by the straight lines interconnecting point $\alpha$(30, 60, 10), point $\beta$(10, 60, 30), point $\gamma$(10, 30, 60), point $\delta$(10, 60, 30), point $\epsilon$(60, 10, 30) and point $\zeta$(60, 30, 10), and more preferably within the region represented by the area enclosed by the straight lines interconnecting point A(20, 50, 30), point B(20, 20, 60) and point C (50, 20, 30), the proportions being such that the total amount of the components (b), (c) and (d) is about 200–1400 parts, and more preferably about 300–1100 parts, per 100 parts by weight of the component (a). With these proportions, the resulting putties exhibit especially outstanding fire retardancy properties when foamed.

The putty of the present invention may further contain other additives in an amount of 0.1–15 parts per 100 parts by weight of the putty. The useful additives include pigments, antioxidants, mineral fillers, carbon black, stabilizers and the flame retardants described in "Flame Retardancy of Polymeric Materials," Volumes 1–2, edited by W. C. Kuryla and A. J. Papa, Marcel Dekker Inc., New York, 1973.

The putty of the present invention can be prepared by mixing the desired materials at room temperature or higher temperature, preferably at a temperature up to about 100° C by a usual mixer such as a kneader, mixtruder, closed-type mixer or two- or three-roll mill.

In a putty in which only components (a) and (b) are present, the 4% by weight minimum of (a) connotes that 96% by weight of (b) will be present. When component (b) is at its 13% minimum, it connotes that 87% by weight of (a) will be present. However, it will seldom be necessary to use as much as 87% of component (a) or as much as 96% of component (b). More commonly, (a) will represent about 4–60%, more preferably about 5–35% and most preferably about 6–25% by weight of the total putty, while (b) will generally represent about 13–85%, more preferably about 15 to about 60% and most preferably about 20–50% by weight. The common, more-, and most-preferred percentages may be used where the putty contains (a) and (b) alone, but the more- and most-preferred percentages are particularly useful where (a) and (b) are present in admixture with the other components described herein.

EXAMPLES 1–21

The putty of each Example given in Table 1 was prepared from the materials listed in the same table, which gives the amounts of the ingredients in parts by weight. The ingredients, at room temperature, were introduced into a mixer having a capacity of one liter and two agitator blades and were mixed for about 10 minutes, during which time their temperature rose to about 80° C. Each putty was tested for mixing compatibility, fire retardancy, moisture resistance, thermal aging resistance and airtightness. The test results, set forth in Table 1, were obtained by the test procedures described following the table.

TABLE 1

| Material | 1 | 2 | 3 | 4 | 5 | 6 | 7 |
|---|---|---|---|---|---|---|---|
| (a)Polybutene[1] | 100 | — | — | — | — | — | 100 |
| Polybutene[2] | — | 100 | 100 | 100 | — | 100 | — |
| Polybutene[3] | — | — | — | — | 80 | — | — |
| Polyisobutylene[4] | — | — | — | — | 20 | — | — |
| Liquid polybutadiene[5] | — | — | — | — | — | — | — |
| (b)Melamine phosphate[6] | 380 | — | — | — | — | — | — |
| Ammonium polyphosphate[7] | — | 350 | 100 | 113 | 135 | 270 | 300 |
| (c)Monopentaerythritol | — | — | 160 | — | 68 | 270 | 300 |
| Dipentaerythritol | — | — | — | 113 | — | — | — |
| (d)Melamine | — | — | 140 | 225 | 248 | 360 | 400 |
| (e)Bentonite grease[8] | — | — | — | — | — | 200 | — |
| Aluminum complex grease[9] | — | — | — | — | — | — | 180 |
| (f)Asbestos fiber[10] | — | — | — | — | — | — | — |
| Glass fiber[11] | — | — | — | — | — | — | — |
| (g)Shirasu balloon[12] | — | — | — | — | — | — | — |
| Glass balloon[13] | — | — | — | — | — | — | — |
| Properties | | | | | | | |
| Mixing compatibility | A | A | A | A | A | A | A |
| Fire retardancy | C | C | B | B | B | A | A |
| Moisture resistance | B | B | A | A | A | A | A |
| Thermal aging resistance | B | B | A | A | A | A | A |
| Airtightness | A | A | A | A | A | A | A |

| Material | 8 | 9 | 10 | 11 | 12 | 13 | 14 |
|---|---|---|---|---|---|---|---|
| (a)Polybutene[1] | — | — | 100 | — | — | 100 | 100 |
| Polybutene[2] | 100 | — | — | 100 | 100 | — | — |
| Polybutene[3] | — | — | — | — | — | — | — |
| Polyisobutylene[4] | — | — | — | — | — | — | — |
| Liquid polybutadiene[5] | — | 100 | — | — | — | — | — |
| (b)Melamine phosphate[6] | — | — | — | — | 900 | 900 | 350 |
| Ammonium polyphosphate[7] | 270 | 270 | 105 | 120 | — | — | — |
| (c)Monopentaerythritol | 270 | 270 | 105 | 120 | — | — | — |
| Dipentaerythritol | — | — | — | — | — | — | — |
| (d)Melamine | 360 | 360 | 140 | 160 | — | — | — |
| (e)Bentonite grease[8] | 200 | 200 | — | — | 200 | 200 | — |
| Aluminum complex grease[9] | — | — | — | — | — | — | — |
| (f)Asbestos fiber[10] | 20 | — | — | 20 | — | 20 | — |
| Glass fiber[11] | — | 30 | — | — | — | — | — |
| (g)Shirasu balloon[12] | — | — | 250 | — | — | — | — |
| Glass balloon[13] | — | — | — | — | — | — | 250 |
| Properties | | | | | | | |
| Mixing compatibility | A | A | B | A | A | A | B |
| Fire retardancy | A | A | B | A | C | C | C |
| Moisture resistance | A | A | A | A | B | B | B |
| Thermal aging resistance | A | A | A | A | B | B | B |
| Airtightness | A | A | A | A | A | A | A |

| Material | 15 | 16 | 17 | 18 | 19 | 20 | 21 |
|---|---|---|---|---|---|---|---|
| (a)Polybutene[1] | — | — | 100 | — | 100 | 100 | — |
| Polybutene[2] | 100 | 100 | — | 100 | — | — | 100 |
| Polybutene[3] | — | — | — | — | — | — | — |
| Polyisobutylene[4] | — | — | — | — | — | — | — |
| (b)Melamine phosphate[6] | 280 | 400 | — | — | — | 210 | — |
| Ammonium polyphosphate[7] | — | — | 200 | 650 | 170 | — | 240 |
| (c)Monopentaerythritol | — | — | — | — | — | — | 240 |
| Dipentaerythritol | 140 | — | — | — | — | — | — |
| (d)Melamine | — | — | 180 | — | 160 | 190 | 320 |
| (e)Bentonite grease[8] | — | — | — | 200 | — | — | 200 |
| Aluminum complex grease[9] | — | — | — | — | — | — | — |
| (f)Asbestos fiber[10] | — | 20 | — | 20 | 20 | — | 20 |
| Glass fiber[11] | — | — | — | — | — | — | — |
| (g)Shirasu balloon[12] | — | — | 100 | — | 100 | — | 80 |
| Glass balloon[13] | — | — | — | 300 | — | — | — |
| Properties | | | | | | | |
| Mixing compatibility | A | A | B | B | B | A | B |
| Fire retardancy | C | C | B | B | B | C | A |
| Moisture resistance | B | B | A | A | A | B | A |
| Thermal aging resistance | B | B | A | A | A | B | A |
| Airtightness | A | A | A | A | A | A | A |

Notes for Table 1:
[1] Polybutene - HV-1,000 (Tradename of Nippon Petrochemicals Co., Ltd., Japan), Viscosity at 210° F: 2,150 c.st.
[2] Polybutene - HV-1,900 (Tradename of Nippon Petrochemicals Co., Ltd., Japan), Viscosity at 210° F: 4,050 c.st.
[3] Polybutene - HV-35 (Tradename of Nippon Petrochemicals Co., Ltd., Japan), Viscosity at 210° F: 90 c.st.
[4] Polyisobutylene - Vistanex-LMMS (Tradename of ESSO Standard Petroleum Co., Ltd., Japan), Viscosity at 210° F: 100,000 c.st.
[5] Liquid Polybutadiene - NISSO - PB.B.3,000 (Tradename of Nippon Soda Co., Ltd. Japan), Viscosity at 210° F: 1,600 c.st.
[6] Melamine phosphate commercially available from Sanwa Chemical Co., Ltd.
[7] Ammonium polyphosphate - Sumiseifu-P (Tradename of Sumitomo Chemical Co., Ltd., Japan)
[8] Cone penetration value: 230 (JIS K2560); drop point: at least 200° C (JIS K2561).
[9] Cone penetration value. 125 (JIS K2560); drop point: at least 200° C (JIS K2561).
[10] Diameter: 0.07 um; length: about 3 mm.
[11] Diameter: 13 um; length: 13 mm.
[12] Particle size: 200–300 um; apparent density: 0.24 (g/cc).
[13] Particle size: 20–80 um; apparent density: 0.21 (g/cc).

Mixing Compatibility

The putty, as removed from the above-described mixer, is visually inspected and handled to evaluate its homogeneity, and is rated as "A", "B" or "C", which represent excellent, good or poor, respectively.

Fire Retardancy

A length of electrical cable about 30 cm long having 3 conductors with cross-sectional areas of 3.5 mm² insulated with cross-linked polyethylene and sheathed with polyvinyl chloride with an outside diameter of 13.5 mm and a 600 volt rating is coated with putty by a trowel to a thickness of about 3 mm to prepare a specimen. To measure the temperature beneath the polyvinyl chloride sheath during the test, a thermocouple is placed between the core and sheath in a portion of the cable which is to be exposed to flame.

The specimen is then contacted with a Bunsen burner flame at a flame temperature of about 1,100°–1,200° C, the thermocouple being in the center of the portion of the cable exposed to the flame. Immediately after the specimen has been contacted with the flame, a line voltage of 600 V A.C. is applied to the cable. The time elapsed from voltage application until short-circuiting is measured. Also, the temperature beneath the sheath is continuously measured with the thermocouple.

Using the criteria set forth in Table 2 below, the specimen is given a rating corresponding to the highest criteria which it passes:

Table 2

| Rating | Criteria (minutes) | |
| --- | --- | --- |
| | Time to short-circuit | Time to 400° C under sheath |
| Excellent | 40 | 30 |
| Good | 30 | 30 |
| Fair | 10 | 10 |
| Acceptable | 4 | 4 |
| Unacceptable | <4 | <3 |

Fire retardancy ratings of excellent, good and fair are indicated by A, B and C respectively in Table 1.

Moisture Resistance

This test employs a cable specimen identical to that used in the above fire retardancy test. It is first sealed at both ends and then stored for 7 days in a constant-temperature (40° C) and constant-humidity (90%, relative) chamber. The specimen, having been conditioned in this manner, is withdrawn from the chamber, dried and tested in the same manner as in the fire retardancy test described above. The specimen is assigned a moisture resistance rating A, B or C, depending on the fire retardancy of the moisture-conditioned specimen, as set forth in the following table:

Table 3

| Fire Retardancy of Conditioned Specimen | Moisture Resistance Ratin |
| --- | --- |
| Excellent to Good | A |
| Fair to Acceptable | B |
| Unacceptable | C |

Thermal Aging Resistance

This test also employs a cable specimen identical to that used in the above fire retardancy test. It is stored for 30 days within a Gear oven adjusted to 70° C and is then tested according to the procedure of the retardancy test. The specimen is assigned a thermal aging resistance rating A, B or C, depending on the fire retardancy of the thermally conditioned specimen, as set forth in the following table:

Table 4

| Fire Retardancy of Conditioned Specimen | Thermal Aging Resistance Rating |
| --- | --- |
| Excellent to Good | A |
| Fair to Acceptable | B |
| Unacceptable | C |

Airtightness

Putty is packed to a thickness of 100 mm into one end of an iron pipe 300 mm in inside diameter and 600 mm in length. While exposing the exterior face of the putty to the atmosphere at room temperature, air pressure of 0.8 kg/cm² gauge is applied to the opposite face, within the pipe, for 5 minutes. If the rate of flow of air through the layer of putty during the pressure application does not exceed 5 liters/minute, the putty is rated acceptable, which is represented by A in Table 1.

ADVANTAGES OF THE INVENTION

The invention is useful in sealing cable throughholes in walls, including especially fire-walls. When used in such application, it resists the spread of smoke and fire via the through-hole. Indeed, it can provide significant improvement over conventional sealing techniques, as illustrated by the following comparative experiments in which Experiments A through C illustrate conventional sealing techniques and their performance and Experiment D illustrates the invention and its performance.

Experiment A

Ten cables of the kind used in the above fire-retardancy test were threaded through a circular bore, 150 mm in diameter, formed in a 100-mmm thick concrete wall. The free area at each end of the bore was closed off with a 3 mm thick steel plate secured to each side of the wall by bolts. One end of the bore was then maintained at a temperature of 700°–800° C for 1 hour by a propane gas burner. One to 2 minutes after heating started, smoke began to escape through the other end of the bore, and marked emission of smoke was observed in 30 to 40 minutes. In 50 minutes, flames spread onto the cables on the end away from the burner.

Experiment B

The procedure of Experiment A was repeated except that the air space within the bore was filled with glass wool to a density of 0.4 g/cc instead of closing the bore with steel plates. As a result, smoke emission from the unheated end of the bore started in 1 to 2 minutes, and became profuse in 20 to 30 minutes.

Experiment C

The procedure of Experiment B was repeated except that a mixture of 100 parts of polybutene (viscosity at 210° F: 17 c. st.) and 400 parts of ammonium polyphosphate was substituted for the glass wool. In about 20 minutes, heavy smoke emission occured, with flames spreading over the cables on the side away from the burner.

Experiment D

The procedure of Experiment C was repeated except that the putty of Example 8 in the above Table 1 was substituted for the composition of Experiment C. About 50 minutes passed between initiation of heating and the first observation of smoke emission, which was slight on the end away from the burner, but the cables at that end were still free of any change at that time.

There is a need from time to time to remove, reshape and/or replace the putty packed into cable through-holes, such as during the replacement of cables or the installation of additional cables. Because the putty of the invention can and usually will be non-hardening, it is very useful in fire-retardant construction of this type. However, it is also useful for packing wall joints, and other cavities, and is similarly effective when used for coating the articles or equipment to be protected against fire. The putty of the invention also has excellent mixing compatibility, moisture resistance, thermal aging resistance, fire retardation and airtightness as can be seen from the above examples.

What is claimed is:

1. A fire retardant intumescent putty having a cone penetration value of 2-40 (mm/150 g, 5 sec., at 20° C) determined in accordance with JIS A 5752-1966, which comprises (a) at least 4% by weight of an organic material which is a semi-solid or liquid at room temperature and has a viscosity of 50-100,000 c.st. at 210° F, (b) at least 13% by weight of a nitrogen-containing phosphate which contains at least 7% by weight of phosphorus and corresponds in structure to a phosphoric acid represented by the general formula, $(xH_2O \cdot yP_2O_5)n$, wherein $0 < (x/y) \leq 3$ and $n$ is 1-14, one or all of the hydrogen atoms of which are substituted with at least one mono-, di-, or trivalent nitrogen-containing group consisting essentially of nitrogen and either or both of hydrogen and carbon, and (c) lubricating grease wherein said grease is in the form of a viscous paste or semi-solid at room temperature, has a cone penetration value of about 40-500 determined in accordance with JIS K 2560-1969, and comprises a thickener and a natural or synthetic oil which is nonvolatile at room temperature.

2. The putty of claim 1, wherein said component (a) is polybutene having a viscosity of 1,000-10,000 at 210° F and said nitrogen-containing phosphate is melamine monophosphate or ammonium polyphosphate of which the average molecular weight and nitrogen content are 200-300,000 and 10-25% by weight, respectively.

3. The putty of claim 1, which contains at least one component selected from the group consisting of (d) polyhydric alcohols and carbonhydrates having an OH index of at least about 0.2 and about 35-70% by weight of carbon per molecule, (e) blowing agents having a decomposition temperature of about 120°-400° C, (f) heat resistant fibers having softening and decomposition temperatures above 200° C, and (g) microballoons having average particle size of about 5-1,000 μm and bulk density of about 0.01-0.7 grams per cubic centimeter.

4. The putty of claim 1, which contains (d) at least one polyhydric alcohol or carbohydrate having an OH index of at least about 0.2 and about 35-70% by weight of carbon per molecule or mixture thereof and (e) at least one blowing agent having a decomposition temperature of about 120-400° C, the proportions of said components (b), (d) and (e) being within the region represented by the area of the triangular coordinates enclosed by the straight lines interconnecting points α, β, γ, δ, ε, and ζ in the accompanying drawing, the total amount of said components (b), (d) and (e) being 200 to 1400 parts per 100 parts by weight of said component (a).

5. The putty of claim 4, which contains at least one component selected from the group consisting of (f) heat resistant fibers having softening and decomposition temperatures above 200° C, and (g) microballoons having average particle size of about 5-1,000 μm and bulk density of about 0.01-0.7 grams per cubic centimeter.

6. The putty of claim 5, wherein said component (a) has a viscosity of 500-10,000 c.st. at 210° F, said component (b) is at least one member selected from the group consisting of melamine monophosphate, melamine diphosphate, and melamine polyphosphate, and said putty also contains (d) polyhydric alcohol which is at least one member of the group consisting of monopentaerythritol, dipentaerythritol, and tripentaerythritol; (e) blowing agent which is at least one member selected from the group consisting of melamine, trimethylol melamine, hexamethylol melamine, dicyandiamide; said grease component (c) is at least one member selected from the group consisting of lithium soap grease, aluminum complex grease, bentonite grease and silica gel grease, said greases having a cone penetration value of about 40-500; (f) asbestos or glass wool fiber; and (g) glass microballoons.

7. The putty of claim 1 wherein said grease component (c) is at least a member selected from the group consisting of lithium soap grease, aluminum complex grease, bentonite grease and silica gel grease, said greases having a cone penetration value of about 40-500.

8. The putty of claim 7 wherein said grease has a cone penetration value of about 80-350.

9. The putty of claim 1 wherein about 70-400 parts of said grease per 100 parts by weight of component (a) are employed.

10. The putty of claim 1 wherein about 100-300 parts of said grease per 100 parts by weight of component (a) are employed.

11. The putty of claim 1 wherein about 150-250 parts of said grease per 100 parts by weight of component (a) are employed.

12. A method for sealing cavity to render it highly air-tight and smoke-tight under both normal and fire exposure conditions which comprises packing into said cavity a fire retardant intumescent putty having a cone penetration value of 2-40 (mm/150 g, 5 sec., at 20° C) determined in accordance with JIS A 5752-1966, which comprises (a) at least 4% by weight of an organic material which is a semi-solid or liquid at room temperature and has a viscosity of 50-100,000 c.st. at 210° F, (b) at least 13% by weight of a nitrogen-containing phosphate which contains at least 7% by weight of phosphorus and corresponds in structure to a phosphoric acid represented by the general formula, $(xH_2O \cdot yP_2O_5)n$, wherein $0 < (x/y) \leq 3$ and $n$ is 1-14, one or all of the hydrogen atoms of which are substituted with at least one mono-, di-, or tri-valent nitrogen-containing group consisting essentially of nitrogen and either or both of hydrogen and carbon, and (c) lubricating grease wherein said grease is in the form of a viscous paste or semi-solid at room temperature, has a cone penetration value of about 40-500 determined in accordance with JIS K 2560-1969, and comprises a thickener and a natural or synthetic oil which is non-volatile at room temperature.

13. The method of claim 12, wherein said component (a) is polybutene having a viscosity of 1,000-10,000 at 210° F and said nitrogen-containing phosphate is melamine monophosphate or ammonium polyphosphate of which the average molecular weight and nitrogen content are 200-300,000 and 10-25% by weight, respectively.

14. The method of claim 12, which contains at least one component selected from the group consisting of (d) polyhydric alcohols and carbohydrates having an OH index of at least about 0.2 and about 35-70% by weight of carbon per molecule, (e) blowing agents having a decomposition temperature of about 120°-400° C, (f) heat resistant fibers having softening and decomposition temperatures above 200° C, and (g) microballoons having average particle size of about 5-1,000 μm and bulk density of about 0.01-0.7 grams per cubic centimeter.

15. The method of claim 12, which contains (d) at least one polyhydric alcohol or carbohydrate having an OH index of at least about 0.2 and about 35-70% by weight of carbon per molecule or mixture thereof and (e) at least one blowing agent having a decomposition temperature of about 120-400° C, the proportions of said components (b), (d) and (e) being within the region represented by the area of the triangular coordinates enclosed by the straight lines interconnecting points α, β, γ, δ, ε, and ζ in the accompanying drawing, the total amount of said components (b), (d) and (e) being 200 to 1400 parts per 100 parts by weight of said component (a).

16. The method of claim 15, which contains at least one component selected from the group consisting of (f) heat resistant fibers having softening and decomposition temperatures above 200° C, and (g) microballoons having average particle size of about 5-1.000 μm and bulk density of about 0.01-0.7 grams per cubic centimeter.

17. The method of claim 16, wherein said component (a) has a viscosity of 500-10,000 c.st. at 210° F, said component (b) is at least one member selected from the group consisting of melamine monophosphate, melamine diphosphate, and melamine polyphosphate, and said putty also contains (d) polyhydric alcohol which is at least one member of the group consisting of monopentaerythritol, dipentaerythritol, and tripentaerythritol; (e) blowing agent which is at least one member selected from the group consisting of melamine, trimethylol melamine, hexamethylol melamine, dicyandiamide; said grease component (c) is at least one member selected from the group consisting of lithium soap grease, aluminum complex grease, bentonite grease and silica gel grease, said grease having a cone penetration value of about 40-500; (f) asbestos or glass wool fiber; and (g) glass microballoons.

18. The method of claim 12 wherein said grease component (c) is at least a member selected from the group consisting of lithium soap grease, aluminum complex grease, bentonite grease and silica gel grease, said grease having a cone penetration value of about 40-500.

19. The method of claim 18 wherein said grease has a cone penetration value of about 80-350.

20. The method of claim 12 wherein about 70-400 parts of said grease per 100 parts by weight of component (a) are employed.

21. The method of claim 12 wherein about 100-300 parts of said grease per 100 parts by weight of component (a) are employed.

22. The method of claim 12 wherein about 150-250 parts of said grease per 100 parts by weight of component (a) are employed.

* * * * *